United States Patent
Brazas, Jr. et al.

[11] Patent Number: 6,038,057
[45] Date of Patent: Mar. 14, 2000

[54] METHOD AND SYSTEM FOR ACTUATING ELECTRO-MECHANICAL RIBBON ELEMENTS IN ACCORDANCE TO A DATA STREAM

[75] Inventors: John C. Brazas, Jr., Hilton; Marek W. Kowarz; Brian E. Kruschwitz, both of Rochester, all of N.Y.

[73] Assignee: Eastman Kodak Company, Rochester, N.Y.

[21] Appl. No.: 09/215,728

[22] Filed: Dec. 18, 1998

[51] Int. Cl.[7] .................................................. G02B 5/18
[52] U.S. Cl. ........................ 359/291; 359/572; 359/573
[58] Field of Search .................................. 359/572, 573, 359/291, 290, 292, 295

[56] References Cited

U.S. PATENT DOCUMENTS

| | | | |
|---|---|---|---|
| 4,011,009 | 3/1977 | Lama et al. ............................ | 359/290 |
| 4,492,435 | 1/1985 | Banton et al. .......................... | 350/360 |
| 4,596,992 | 6/1986 | Hornbeck ................................ | 346/76 |
| 5,115,344 | 5/1992 | Jaskie .................................... | 359/573 |
| 5,311,360 | 5/1994 | Bloom et al. ........................... | 359/572 |
| 5,459,610 | 10/1995 | Bloom et al. ........................... | 359/572 |
| 5,661,593 | 8/1997 | Engle ..................................... | 359/292 |
| 5,677,783 | 10/1997 | Bloom et al. ........................... | 359/224 |
| 5,757,536 | 5/1998 | Ricco et al. ............................ | 359/224 |
| 5,841,579 | 11/1998 | Bloom et al. ........................... | 359/572 |
| 5,844,711 | 12/1998 | Long, Jr. ................................. | 359/291 |
| 5,949,570 | 9/1999 | Shiono et al. .......................... | 359/291 |

OTHER PUBLICATIONS

Sandejas, F., "Silicon Microfabrication of Grating Light Valves", Ph.D. Dissertation, Stanford University, Jul. 1995, pp. 1–291.

Gudeman, et al., "Squeeze Film Damping of Doubly Supported Ribbons in Noble Gas Atmospheres," Solid–State Sensor and Actuator Workshop, Jun. 8–11, 1998, pp. 288–291.

*Primary Examiner*—Georgia Epps
*Assistant Examiner*—Margaret Burke
*Attorney, Agent, or Firm*—William F. Noval

[57] ABSTRACT

A method is disclosed for actuating electro-mechanical ribbon elements which are suspended over a channel. The channel defines a bottom surface and having a bottom conductive layer formed below said bottom surface. A data generator provides a data stream. The data generator is connected to a modulator. Additionally, an actuation voltage generator, connected to the modulator, produces a periodic high frequency voltage signal that has a frequency close to mechanical resonant frequency $f_R$ of the ribbon elements. The signal from the modulator is applied to the ribbon elements 31 of the electro-mechanical grating device.

11 Claims, 10 Drawing Sheets

METHOD AND SYSTEM FOR ACTUATING ELECTRO-MECHANICAL RIBBON ELEMENTS IN ACCORDANCE TO A DATA STREAM

CROSS REFERENCE TO RELATED APPLICATIONS

Reference is made to U.S. Ser. No. 09/216,289 (EK Docket No. 78,657) filed concurrently, entitled "A Mechanical Grating Device," and to U.S. Ser. No. 09/216,559 (EK Docket No. 78,594) filed concurrently, entitled "A Multi-level Electro-Mechanical Grating Device And A Method For Operating A Multilevel Mechanical And Electro-Mechanical Grating Device".

FIELD OF THE INVENTION

This invention relates to a method and a system for actuating electro-mechanical ribbon elements of a Grating Light Valve (GLV) in accordance to a data stream. More particularly the invention relates to a method and system which improves the light output of the GLV.

BACKGROUND OF THE INVENTION

Electro-mechanical spatial light modulators have been designed for a variety of applications, including image processing, display, optical computing and printing. Optical beam processing for printing with deformable mirrors has been described by L. J. Hornbeck; see U.S. Pat. No. 4,596,992, issued Jun. 24, 1984, entitled "Linear Spatial Light Modulator and Printer". A device for optical beam modulation using cantilever mechanical beams has also been disclosed; see U.S. Pat. No. 4,492,435, issued Jan. 8, 1985 to M. E. Banton, entitled "Multiple Array Full Width Electro-Mechanical Modulator," and U.S. Pat. No. 5,661,593, issued Aug. 26, 1997 to C. D. Engle, entitled "Linear Electrostatic Modulator". Other applications of electro-mechanical gratings include wavelength division multiplexing and spectrometers; see U.S. Pat. No. 5,757,536, issued May 26 1998 to A. J. Ricco et al., entitled "Electrically Programmable Diffraction Grating".

Electro-mechanical gratings are well known in the patent literature; see U.S. Pat. No. 4,011,009, issued Mar. 8, 1977 to W. L. Lama et al., entitled "Reflection Diffraction Grating Having a Controllable Blaze Angle," and U.S. Pat. No. 5,115,344, issued May 19, 1992 to J. E. Jaskie, entitled "Tunable Diffraction Grating". More recently, Bloom et al. described an apparatus and method of fabrication for a device for optical beam modulation, known to one skilled in the art as a grating light valve (GLV); see U.S. Pat. No. 5,311,360, issued May 10, 1994, entitled "Method and Apparatus for Modulating a Light Beam". This device was later described by Bloom et al. with changes in the structure that included: 1) patterned raised areas beneath the ribbons to minimize contact area to obviate stiction between the ribbon and substrate; 2) an alternative device design in which the spacing between ribbons was decreased and alternate ribbons were actuated to produce good contrast; 3) solid supports to fix alternate ribbons; and 4) an alternative device design that produced a blazed grating by rotation of suspended surfaces see U.S. Pat. No. 5,459,610, issued Oct. 17, 1995 to Bloom et al., entitled "Deformable Grating Apparatus for Modulating a Light Beam and Including Means for Obviating Stiction Between Grating Elements and Underlying Substrate". Bloom et al. also presented a method for fabricating the device; see U.S. Pat. No. 5,677,783, issued Oct. 14, 1997, entitled "Method of Making a Deformable Grating Apparatus for Modulating a Light Beam and Including Means for Obviating Stiction Between Grating Elements and Underlying Substrate".

According to the prior art, for operation of the GLV device, an attractive electrostatic force is produced by a single polarity voltage difference between the ground plane and the conducting layer atop the ribbon layer. This attractive force changes the heights of the ribbons relative to the substrate. Modulation of the diffracted optical beam is obtained by appropriate choice of the voltage waveform. The voltage needed to actuate a ribbon a certain distance depends on several factors including the stress in the ribbon material and the ribbon length. In practice, especially with grating elements that have a large restoring force and are therefore not likely to have stiction problems, the actuation voltage needed to achieve the maximum diffraction efficiency is often larger than can be provided by standard CMOS driver circuitry. It is well known that the ribbon elements of the GLV device possess a resonance frequency which depends primarily on the tension, the elasticity, and length of the ribbons; see for example "Silicon Microfabrication of Grating Light Valves," Ph.D. Thesis, Stanford University 1995, Chapter 3, by F. S. A. Sandejas. The mechanical response of the ribbon elements is damped by the surrounding gas as described in "Squeeze Film Damping of Double Supported Ribbons in Noble Gas Atmospheres," Proc. Of Solid-State Sensor and Actuator workshop, Hilton, Head, S.C., Jun. 8–11, 198, pp. 288–291. This damping depends on the type of gas present and pressure, and determines the width of the resonant peak associated with the resonant frequency of the ribbons.

SUMMARY OF THE INVENTION

It is an object of the present invention to provide a method for actuating electro-mechanical ribbon elements wherein the efficiency of the electro-mechanical grating device is increased and the driving voltage for the electro-mechanical ribbon elements is reduced.

This object is achieved with a method for actuating electro-mechanical ribbon elements suspended over a channel defining a bottom surface and having a bottom conductive layer formed below said bottom surface, the method comprising the steps of:

providing a data stream;

generating in accordance to said data stream a modulated high frequency voltage signal; and applying said modulated high frequency voltage signal to the ribbon elements.

Another object is to provide a system for actuating electro-mechanical grating elements wherein the inventive system provides an efficiency increase of the electro-mechanical grating device and thereby reduces the driving voltage for the electro-mechanical ribbon elements.

This object is achieved with a system for actuating electro-mechanical ribbon elements suspended over a channel defining a bottom surface and having a bottom conductive layer formed below said bottom surface the system comprising:

a data generator for providing a data stream; and a modulator for generating from said data stream a modulated high frequency voltage signal.

An advantage of the inventive method and the system is a higher light output for a given voltage applied to the ribbon elements wherein the voltage is insufficient to fully actuate the ribbon elements in the static case. The actuation of the ribbons, which changes the ribbon height relative to the substrate, is a result of an applied voltage that produces an electrostatic force. This invention describes voltage waveforms for actuating the ribbon elements near their mechanical resonance frequency. When the ribbons are excited resonantly, the voltage necessary to produce a given optical intensity in the diffracted beam is significantly reduced. The reduced actuation voltage simplifies integration with standard microelectronic driver circuitry, specifically with CMOS. In addition, the resonant excitation reduces the possibility of ribbon failure due to stiction. The invention can be applied to a variety of pulse modulation schemes including width modulation, amplitude modulation, position modulation and hybrid techniques. Further advantageous effects of the present invention are disclosed in the dependent claims.

BRIEF DESCRIPTION OF THE DRAWINGS

The subject matter of the invention is described with reference to the embodiments shown in the drawings.

DETAILED DESCRIPTION OF THE INVENTION

Figures 1A, 1B:
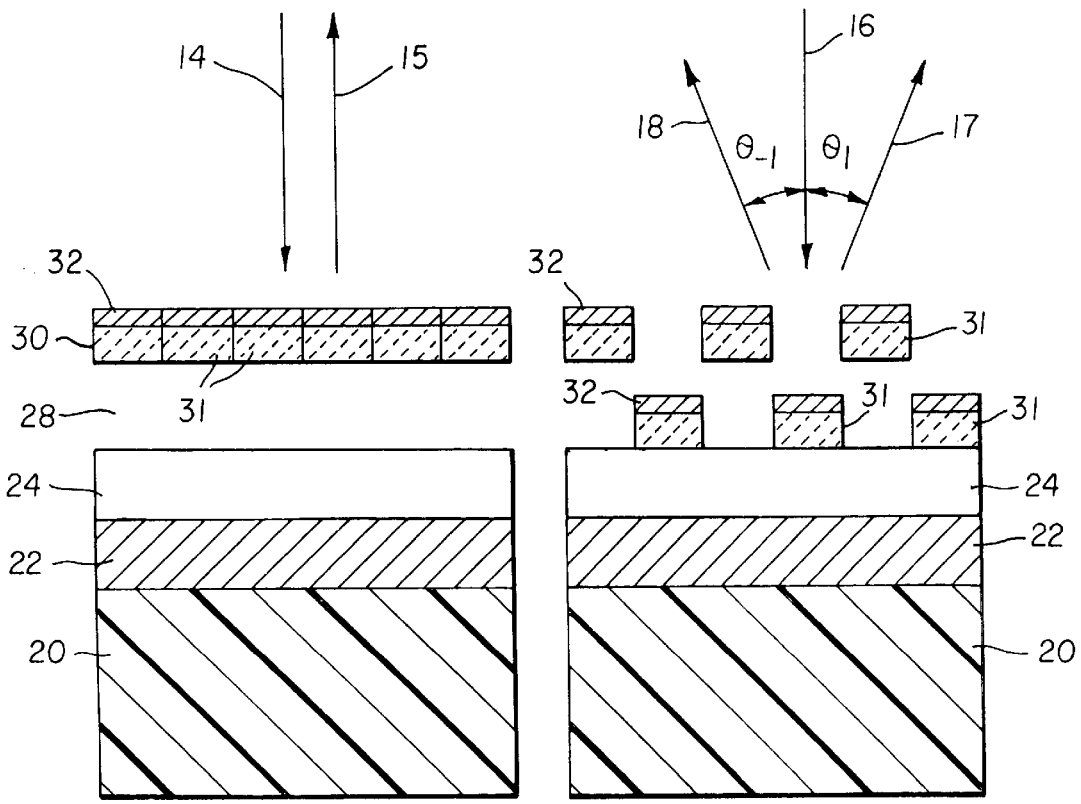
FIGS. 1a–1b is an illustration of light diffraction by a bi-level electro-mechanical grating device in the un-actuated and actuated state respectively.
Figure 2:
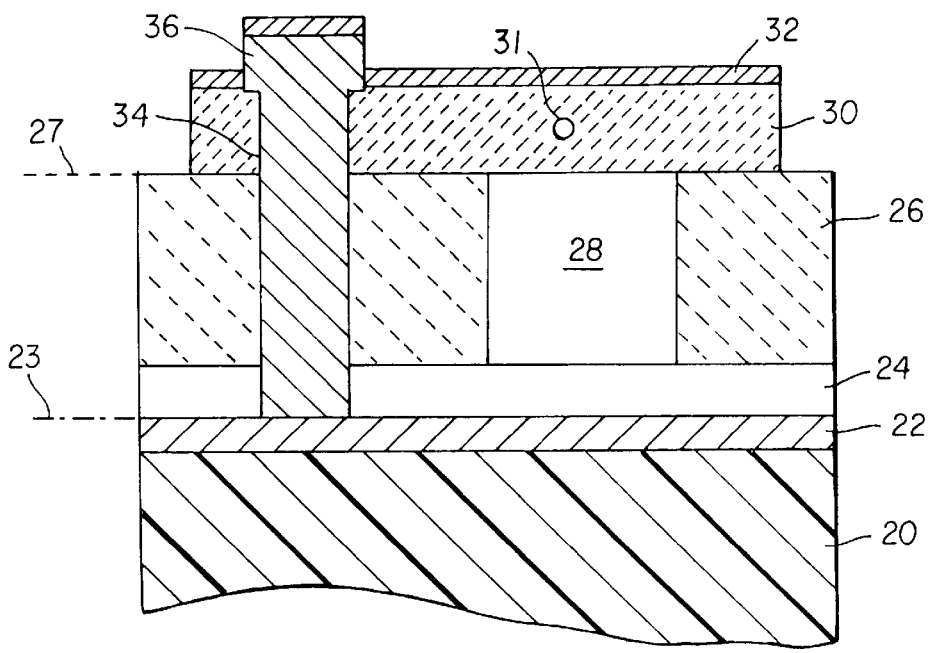
FIG. 2 is a view perpendicular to the illustration of FIG. 1 showing a suspended unactuated ribbon element above the channel and with supporting layers.

The structure of a typical Grating Light Valve (GLV) device is shown in the cross-sectional views in FIGS. 1a, 1b and 2. FIG. 1a depicts the ribbon structure of the device in the un-actuated and FIG. 1b in the actuated state. FIG. 2 is the view of the same device (as shown in FIG. 1a) in the un-actuated state but rotated 90 degrees to provide an insight into the layer build-up of the GLV. Referring to FIG. 2, typically a substrate 20 is provided which may be a single crystal silicon wafer or glass. In the case of a single crystal silicon wafer, a bottom conductive layer 22 is generated by heavily doping the silicon near the surface 23 of the substrate 20. If glass is used as a substrate, the increased conductivity is achieved by depositing a bottom conductive layer 22 on the surface of the glass substrate 20. The conductive layer 22 is covered by a protective layer 24, which can be for the example of a silicon substrate, thermal oxide. A dielectric spacer layer 26 is formed atop the protective layer 24 and contains a channel 28 where the active region of the GLV device is located. The channel 28 defines a depth which is governed by the deposited thickness of the spacer layer 26. The spacer layer 26 defines an upper surface level 27. A plurality of ribbon elements 31 is patterned from a ribbon layer 30 formed atop the spacer layer 26. The ribbon layer 30 comprises a dielectric material, which may be silicon nitride, covered by a conductive and reflective layer 32. The conductive and reflective layer 32 of every other ribbon element 31 is connected to the bottom conductive layer 22 through an opening 34 that is filled with a thick layer of conducting material 36. The thickness and tensile stress of the ribbon layer 30 is chosen to optimize performance by influencing the electrostatic force required for actuation and the returning force, which affects the speed, resonance frequency and voltage requirements of the ribbon elements 31 of the GLV.

For operation of the device, an attractive electrostatic force is produced by a voltage difference between the bottom conductive layer 22 and the reflective and conductive layer 32 atop the ribbon layer 30. In the un-actuated state (see FIG. 1a), with no voltage difference, all of the ribbon elements 31 in the GLV device are suspended above the substrate 20 at the same height. In this state, an incident light beam 14 is primarily reflected into the mirror direction as a reflected light beam 15. To obtain the actuated state (see FIG. 1b), a voltage is applied to every other ribbon element producing a periodic grating. In the fully actuated state every other ribbon element is in contact with the protective layer 24. When the height difference between adjacent ribbons is ¼ of the wavelength of an incident light beam 16' the light beam is primarily diffracted into a $1^{st}$ order 17 and a $-1^{st}$ order 18. One or both of these diffracted orders can be collected and used by an optical system (not shown), depending on the application. When the applied voltage is removed, the forces due to the tensile stress and the bending moment restore the ribbon elements 31 to their original un-actuated state (see FIG. 1a).

Figure 3A:
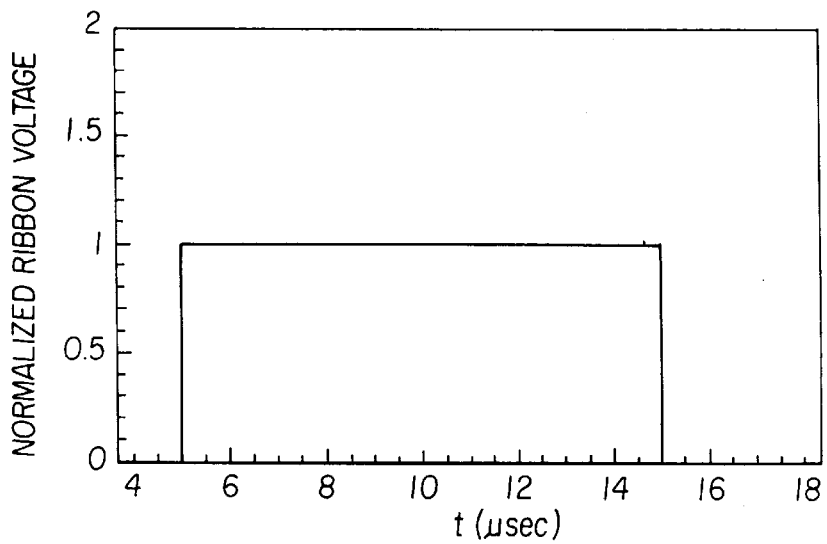
FIGS. 3a–3c are graphs depicting ribbon element actuation by a constant-amplitude voltage pulse with the ribbon element response and the temporal variation of the light intensity.
Figure 3B:
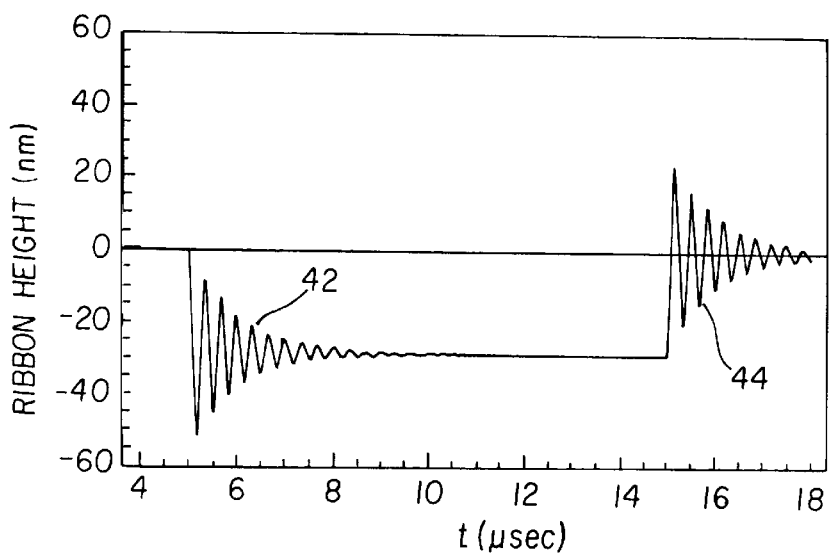
Figure 3C:
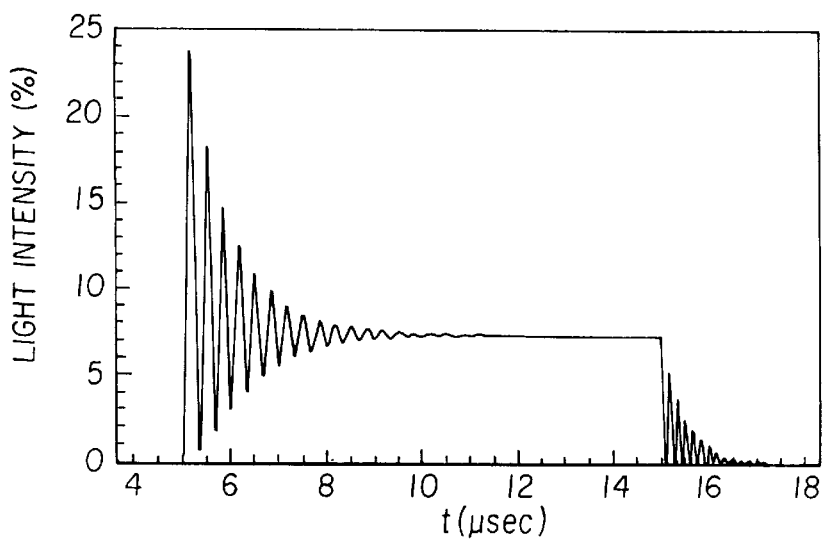
Figure 4A:
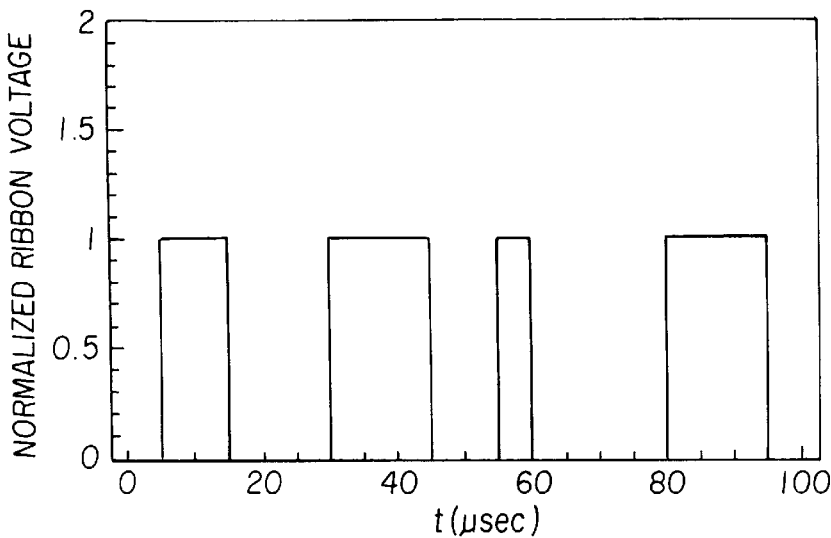
FIGS. 4a–4c are graphs depicting pulse width modulation of the light intensity with a series of constant-amplitude voltage pulses.
Figure 4B:
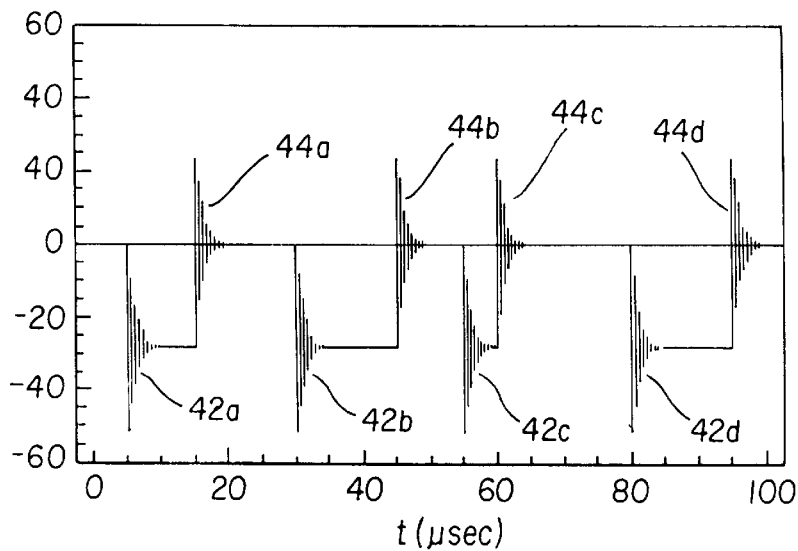
Figure 4C:
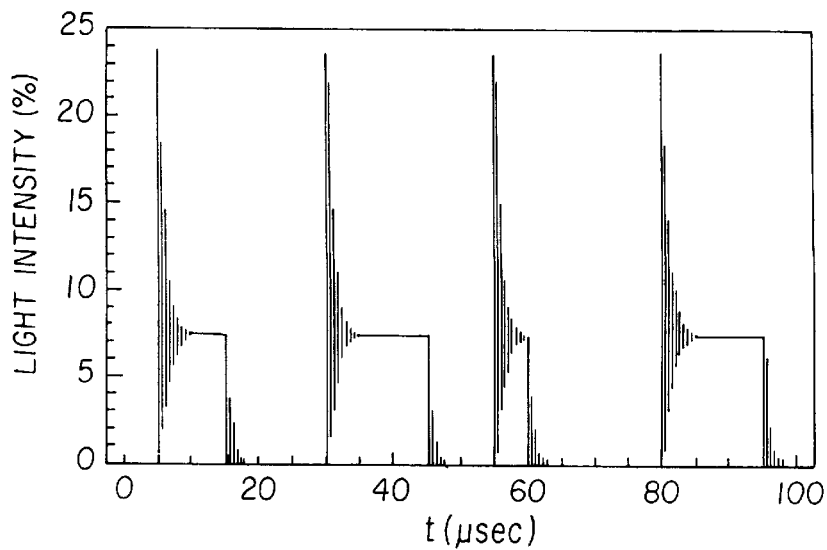

According to the prior art, the ribbon elements 31 can be actuated and released by applying constant-amplitude voltage pulse. FIGS. 3a and 3b illustrate the typical response of the ribbon elements 31 to a voltage pulse under conditions where damping forces on the ribbon elements 31 are relatively small so that the ribbon elements 31 are significantly underdamped. The time scale of the horizontal axis in FIGS. 3a to 3c is in microseconds. In this particular case, the voltage (as shown in FIG. 3a) is insufficient to bring the ribbon elements 31 into contact with the protective layer 24 on the substrate and ringing is observed both during pull-down 42 and release 44. When released, the ribbon elements actually overshoot their un-actuated position. The corresponding light intensity distribution is shown in FIG. 3c as a percentage of the intensity obtained with ¼ wave displacement of the ribbons. As shown in FIGS. 4a–4c, pulse width modulation of the light intensity can be obtained by using a sequence of such voltage pulses (as shown in FIG. 3a) with varying widths. A data stream is converted into a sequence of voltage pulses of varying width. Again ringing is observed during each pull-down 42a–42d and release 44a–44d of the ribbon.

Figure 5A:
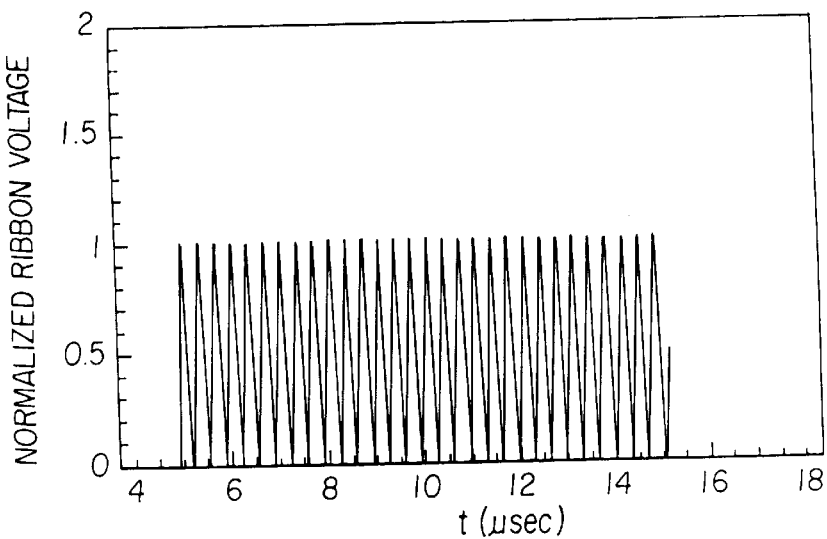
FIGS. 5a–5c are graphs depicting ribbon element actuation by a finite-duration periodic voltage waveform that is unipolar with the ribbon element response and the temporal variation of the light intensity.
Figure 5B:
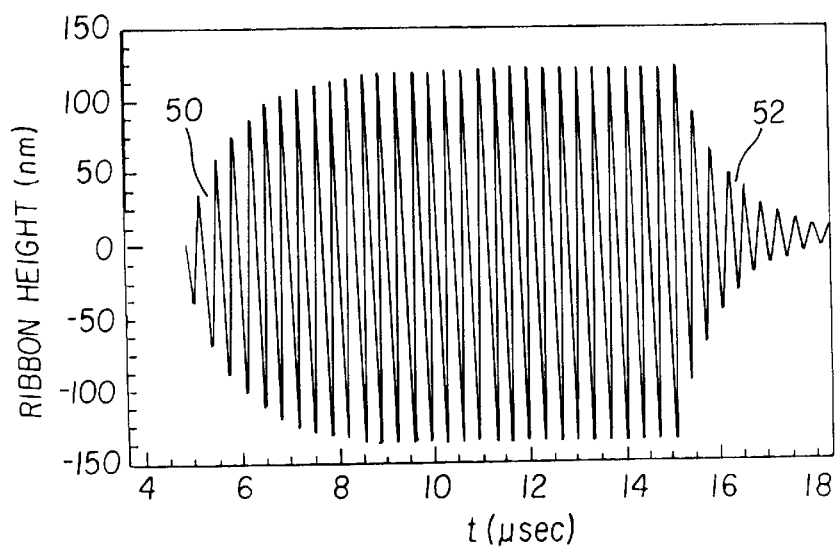
Figure 5C:
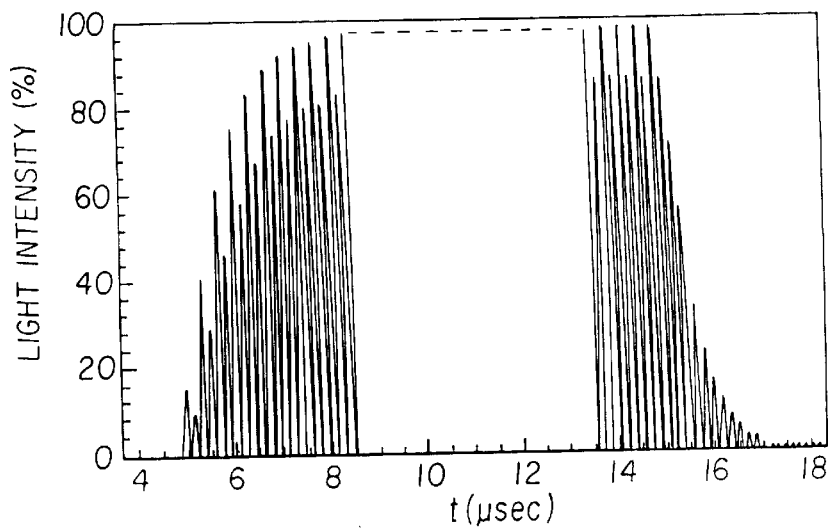

If, instead of a constant-amplitude voltage pulse, the ribbon elements 31 are excited by a finite-duration periodic voltage waveform of the same amplitude as shown in FIG. 3a, but with a high carrier frequency that is close to the mechanical resonance frequency $f_R$ of the ribbon elements 31 (see FIG. 5a), the displacement of the ribbon elements 31 (see FIG. 5b) can be increased significantly. This mechanical resonance frequency depends primarily on properties of the ribbon material, including stress and elasticity, and the geometry of the ribbon elements 31. Typical values for $f_R$ are in the 1 to 10 MHz range. As illustrated in FIGS. 5a–5c, a unipolar finite-duration voltage signal containing a resonant carrier at frequency $f_R$ produces a much larger displacement of the ribbon elements 31 (FIG. 5b) and a larger average light intensity level than possible with the constant-amplitude voltage pulse of FIG. 3a. It should be noted that the finite rise time 50 and decay time 52 need to be taken into account in the final system design. For printing and display applications, the high-frequency intensity variation visible in FIG. 5c is not of importance. Only the average light intensity during a given pulse length matters. For the particular example considered here, comparing FIG. 5c with FIG. 3c, we see that the average light intensity with resonant excitation is approximately 5 times larger than that from a constant-amplitude voltage pulse. In addition, because the ribbon elements 31 are continuously in motion, and contact with the substrate 20 during actuation occurs only for less than a microsecond, resonant excitation reduces a possible failure of ribbon elements due to stiction.

Figure 6A:
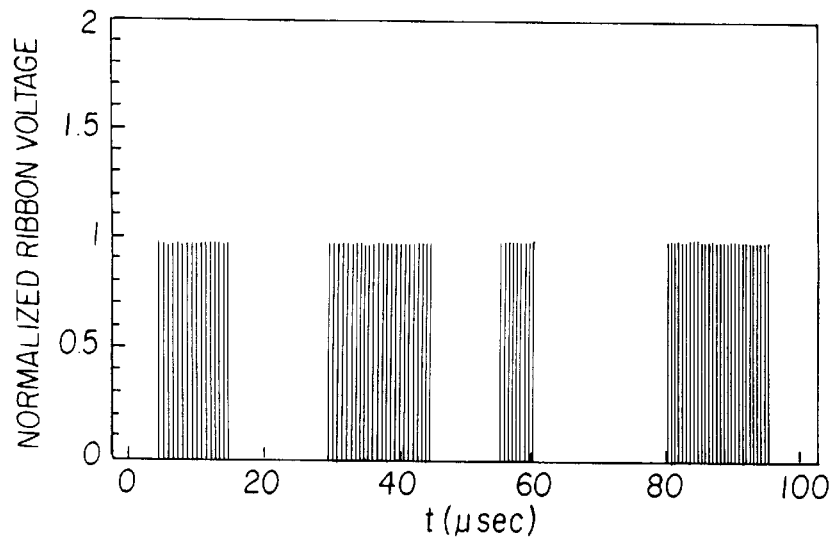
FIGS. 6a–6c are graphs depicting pulse width modulation of the light intensity with an unipolar voltage waveform that contains a carrier whose frequency is close to the mechanical resonance frequency of the ribbon elements.
Figure 6B:
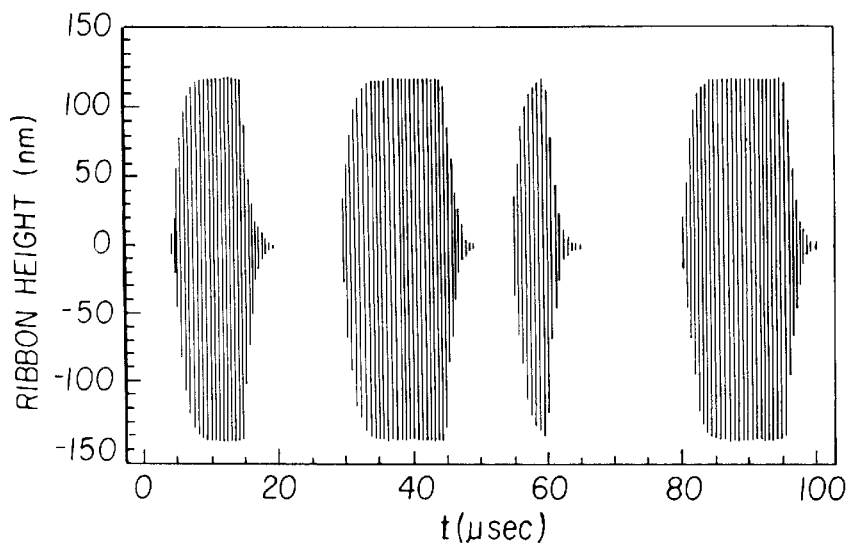
Figure 6C:
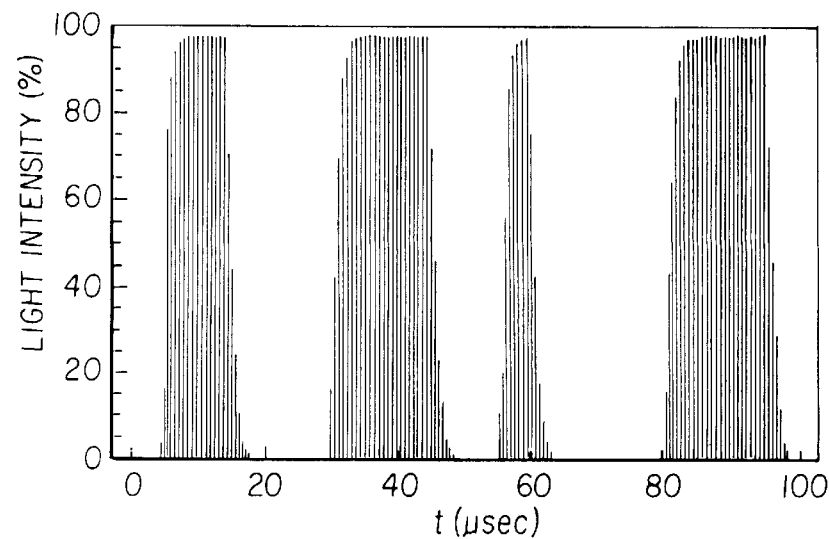
Figure 7:
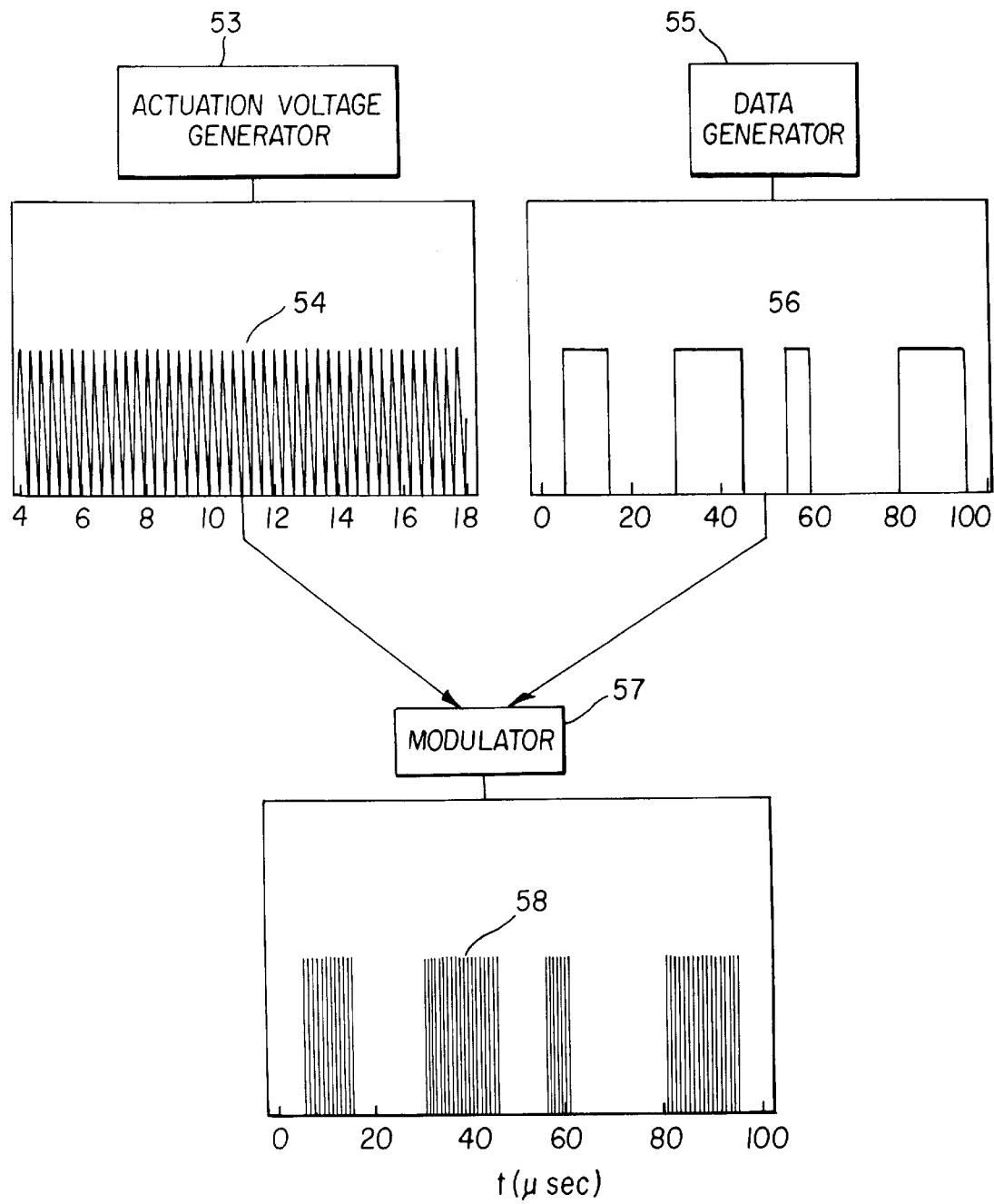
FIG. 7 is a block diagram of a system that generates a pulse-width-modulated unipolar voltage waveform with a carrier frequency.

Pulse width modulation incorporating the resonant carrier frequency $f_R$ can be obtained by varying the width of a sequence of voltage pulses containing the carrier as shown in FIGS. 6a–6c. A comparison of FIGS. 6c and 4c shows that the resulting light output is approximately 5 times higher than with the modulation scheme as disclosed in FIG. 4a. Other modulation schemes including pulse amplitude, pulse position and hybrid techniques are also possible with the resonant carrier frequency. FIG. 7 shows the embodiment for implementing pulse width modulation. Here an actuation voltage generator 53 produces a periodic high frequency voltage signal 54 that has a frequency close to $f_R$ and a data generator 55 produces the pulse-width-modulated grating data 56 which represents an incoming data stream. In the embodiment shown here the high frequency voltage signal is unipolar with respect to a bias voltage applied to the bottom conductive layer 22 of the electro-mechanical grating device. The outputs of the actuation voltage generator 53 and data generator 55 are sent to a modulator 57. The modulator 57 uses the data signal 56 as a gate to produce a ribbon voltage 58, which is applied to the ribbon elements 31 of the electro-mechanical grating device.

The voltage difference that produces the electrostatic force for actuation of the ribbon elements 31 leads to a large electric field in the device, typically $10^8$ to $10^9$ V/m depending on material thicknesses and applied voltage. This electric field can cause injection and trapping of charge into the dielectric materials between the conductive layer 32 of the ribbon elements 31 and the bottom conductive layer 22. In microelectronic devices, charging is known to occur in a variety of insulating thin films including silicon nitride and silicon dioxide. Nitride in particular can be used as a charge storage layer in non-volatile memories because of its long-term charging capability. Charge accumulation on the ribbons of a grating light valve can cause detrimental variations in the operation of the device from one actuation to the next.

Figure 8A:
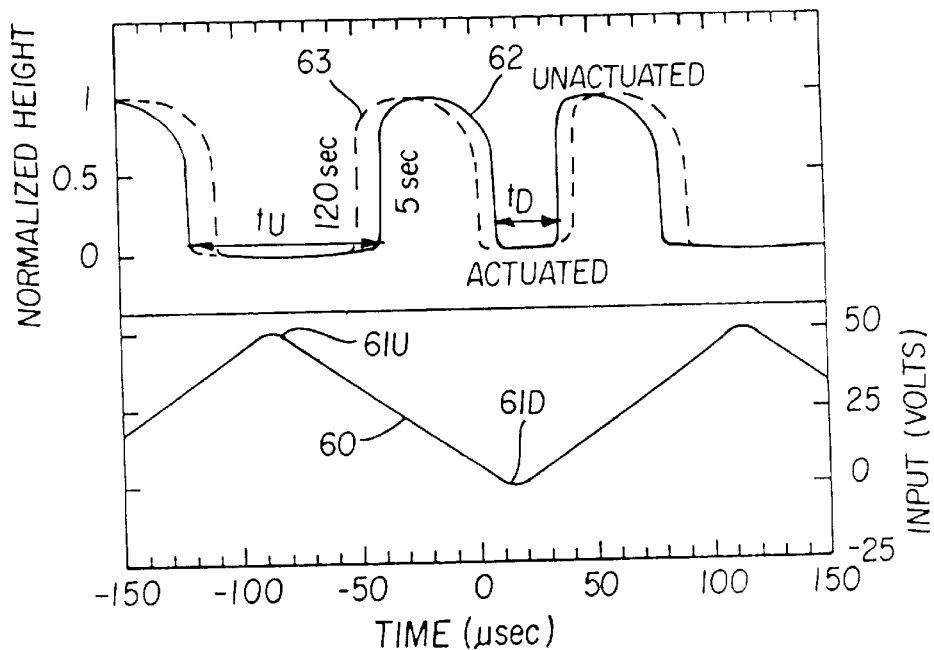
FIGS. 8a to 8b are graphs showing change in ribbon behavior due to charging with actuation by a unipolar triangular waveform.
Figure 8B:
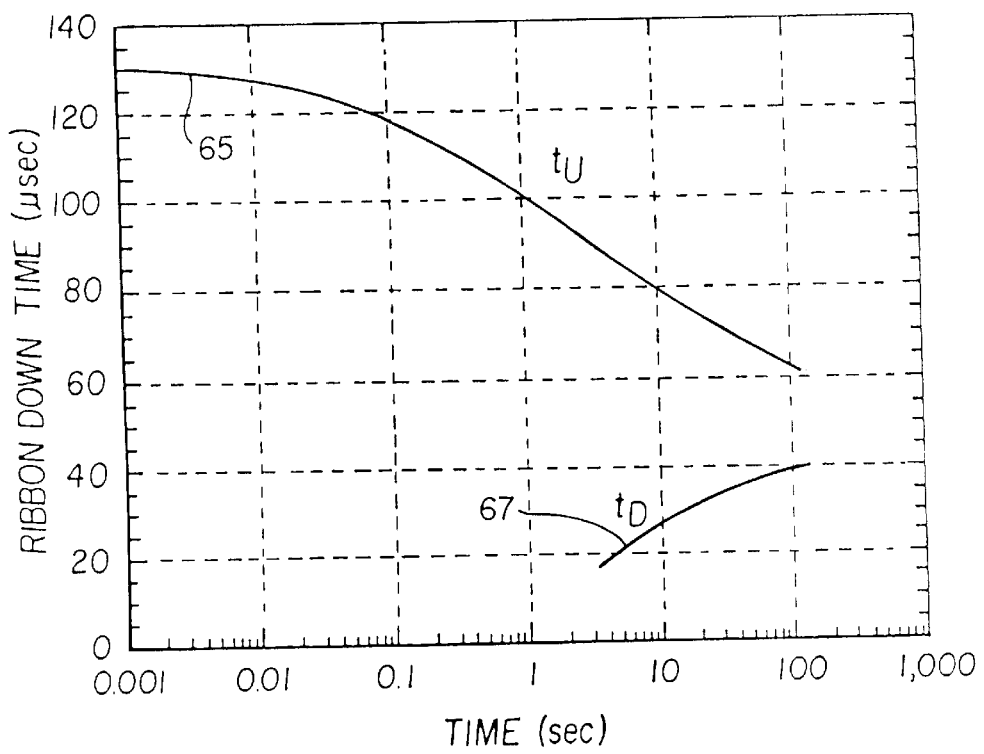

Charge accumulation with repeated actuation was observed on an electro-mechanical grating device of the type shown in FIG. 1. The device contained thermal oxide as the protective layer 24 on top of the bottom conductive layer 22 and ribbon elements 31 having a silicon nitride ribbon layer 30 covered with an aluminum conductive and reflective layer 32. A 5 KHz 50V triangular voltage waveform with positive polarity was used to actuate the ribbon elements 31 into contact with the substrate 22. A triangular waveform was chosen because it allows the charge accumulation to be quantified by measuring the length of time the ribbon elements 31 remain in contact with the protective layer 24 on the substrate 22 during each actuation, i.e., the ribbon element down time. FIG. 8a shows a waveform 60 applied to the ribbon elements 31 and the time-dependent position of a single ribbon element for two different time delays, 5 and 120 seconds, after the onset of actuation. The behavior of the ribbon element 31 is significantly different 120 seconds 63 after actuation than at 5 seconds 62 after actuation. Measurement of the two time intervals $t_U$ and $t_D$ with a time interval analyzer (TIA) provides a convenient means for monitoring the change in response of the ribbon elements 31 from one actuation to the next. Here $t_U$ is the time the ribbon element is in contact with the surface when the voltage of the applied waveform 60 is near its maximum 61U and $t_D$ is the time the ribbon is in contact when the voltage is near its minimum 61D, which is zero in this case. FIG. 8b shows the measured TIA data as a function of time delay after initial actuation. Before any significant charging occurs 65, the ribbon element 31 down time $t_U$ is approximately 130 $\mu$sec and the down time $t_D$ is zero because the ribbons do not actuate when the voltage waveform is near zero. After approximately 3 seconds and roughly 15000 actuations, charging of the ribbon elements 31 becomes large enough to fully actuate the ribbon when the applied voltage is near zero and $t_D$ becomes non-zero 67. If the applied voltage waveform is turned off past this point, the ribbon element 31 will become fully actuated because of the accumulated charge present.

Figure 9A:
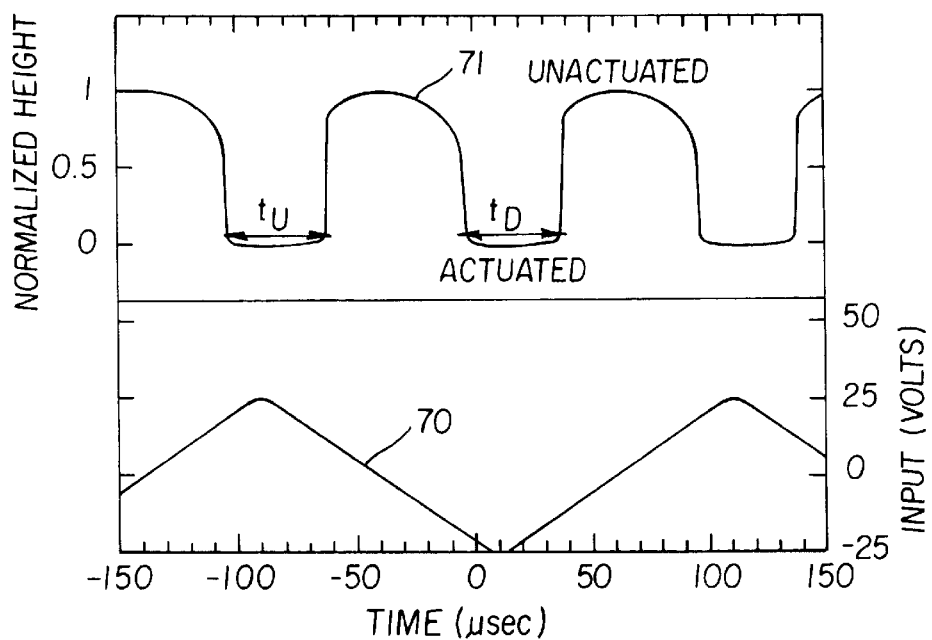
FIGS. 9a to 9b are graphs showing stable ribbon behavior with actuation by a bipolar triangular waveform.
Figure 9B:
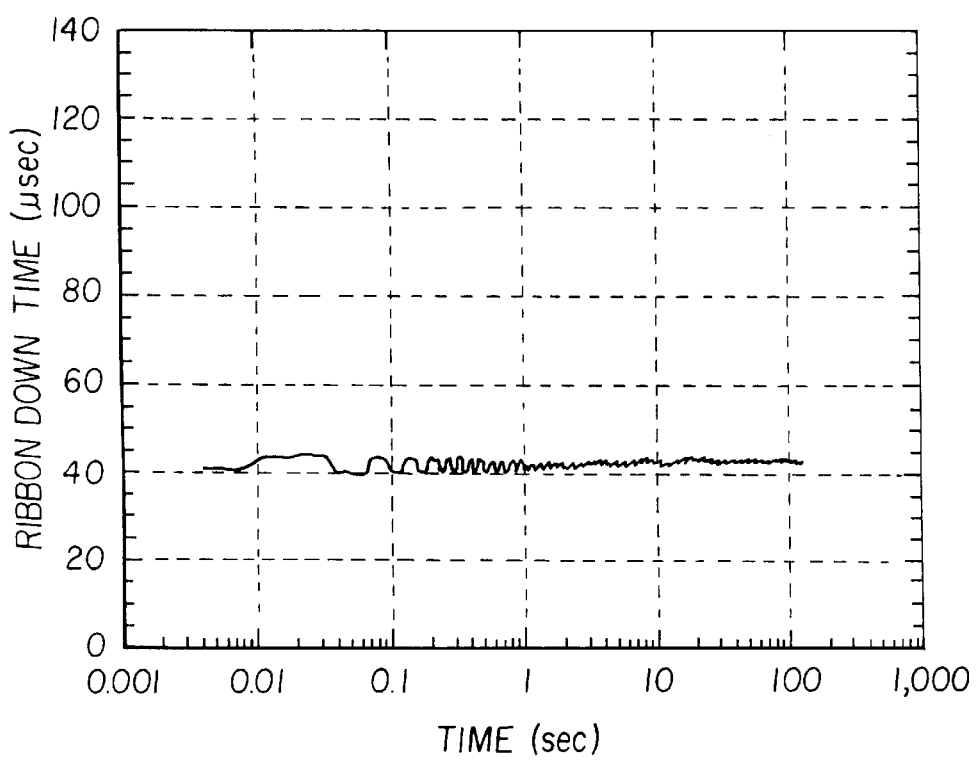

In order to achieve stable device operation, the ribbon elements 31 can be actuated as shown in FIG. 9a with a bipolar triangular waveform 70 (the bipolarity is determined with respect to a bias voltage applied to the bottom conductive layer 22 of the GLV). In this mode of operation, any dielectric charging that occurs during the positive portion of the waveform is canceled during the negative portion and vice versa, resulting in a stable ribbon element response 71. The down time of the ribbon elements is equal during both positive and negative portion of the waveform and is independent of time from initial actuation as shown in FIG. 9b.

Figure 10A:
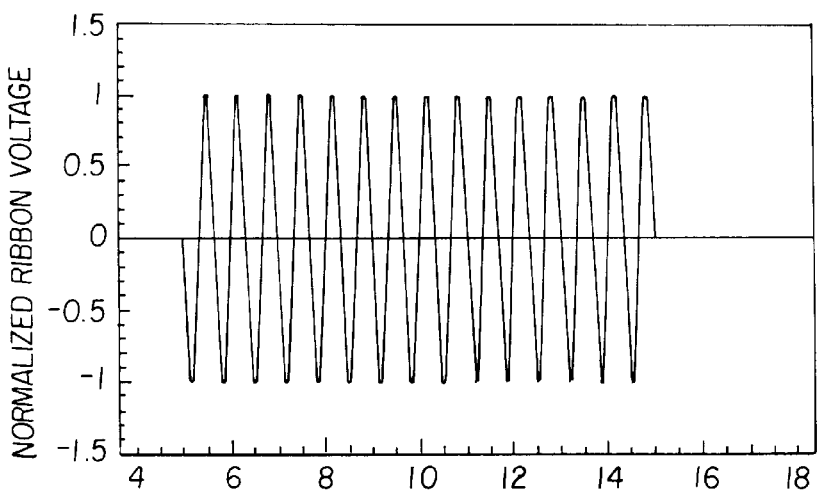
FIGS. 10a to 10c are graphs illustrating ribbon element actuation by a finite-duration periodic voltage waveform that is bipolar with the ribbon response and the temporal variation of the light intensity.
Figure 10B:
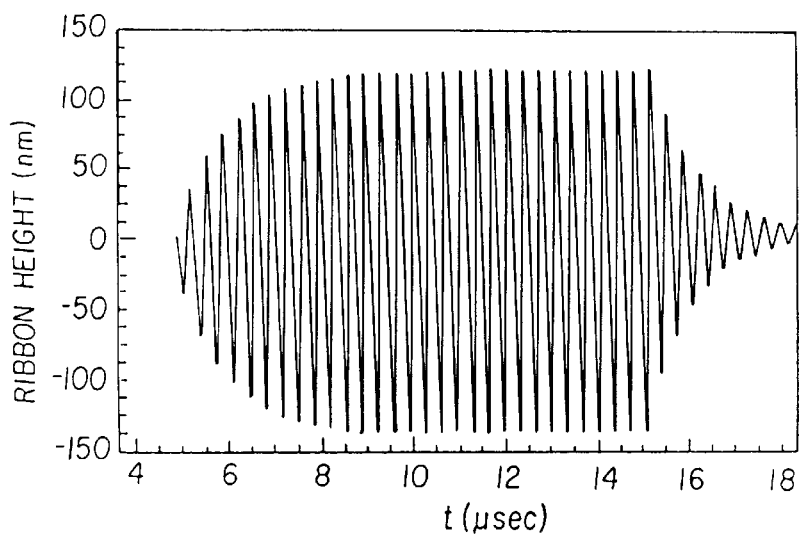
Figure 10C:
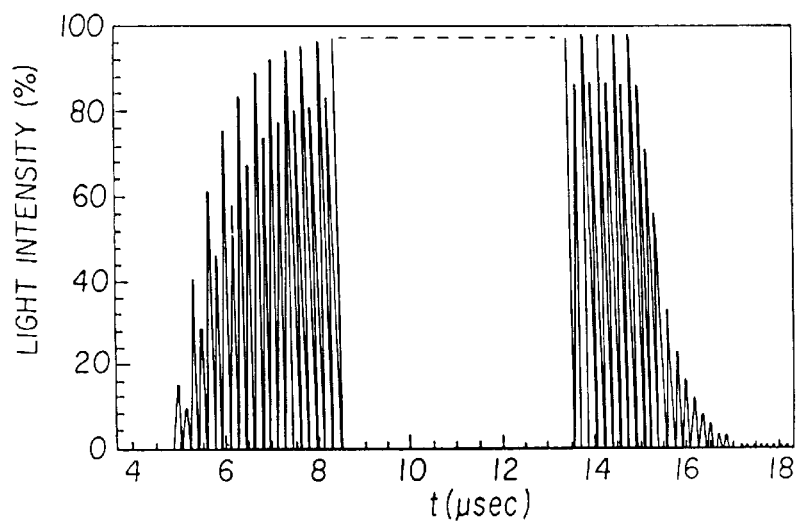

If the ribbon elements 31 are excited by a finite-duration periodic voltage waveform that is bipolar and that has a carrier frequency close to one half of the mechanical resonance frequency $f_R$ of the ribbon elements 31, the displacement of the ribbon elements 31 can be increased while simultaneously reducing dielectric charging effects. With bipolar excitation, the carrier frequency of the voltage needed to resonantly actuate the ribbon elements 31 is reduced by a factor of two because the electrostatic force on the ribbons depends only on the magnitude of the applied voltage and is, therefore, at twice the carrier frequency. This method of actuating the ribbons is illustrated in FIGS. 10a–10c. The voltage waveform in FIG. 10a has a carrier frequency of $f_R/2$. The resulting light intensity variation is very similar to the unipolar case shown in FIG. 5.

Figure 11:
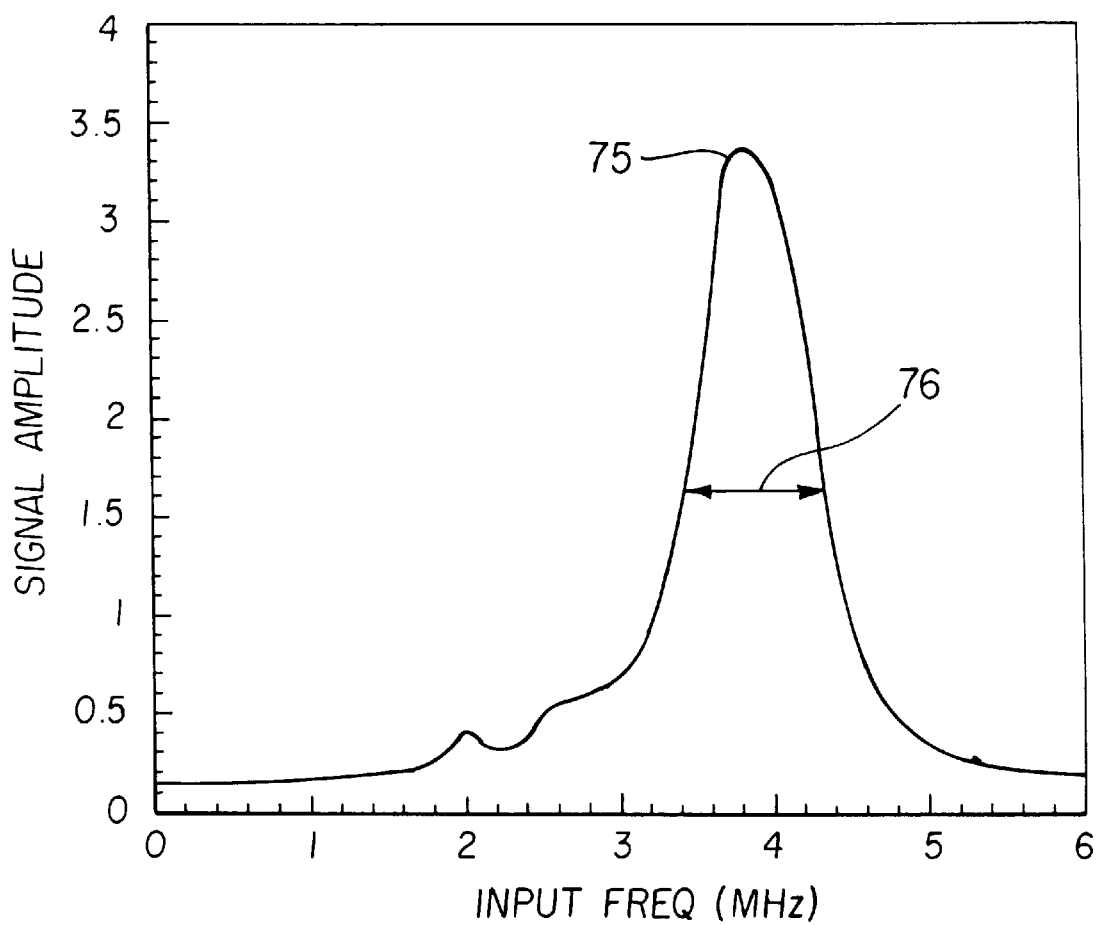
FIG. 11 is a graph showing the response of an electro-mechanical grating device as a function of frequency for a bipolar sinusoidal voltage.

The resonant behavior of an electro-mechanical grating device of the type shown in FIG. 1 was studied experimentally by illuminating the device with a laser and measuring $0^{th}$ order reflected light with a photodetector. A bipolar sinusoidal voltage waveform was used to actuate the ribbon elements. FIG. 11 shows the amplitude of the photodetector signal as a function of the excitation frequency. The 7.6 MHz mechanical resonance of the ribbons is excited when the actuation voltage has a frequency close 3.8 MHz. A resonant peak 75 having a width 76 is measurable. The width 76 of the resonant peak 75 depends on the damping of the ribbon and determines how close the actuation frequency must be to $f_R/2$. The damping effects depend also on the gas pressure in the GLV and on the species of gas used therein.

It is not always possible to obtain bipolar voltages with standard driver circuitry. In these cases, the bottom conductive layer 22 can be biased at a finite non-zero voltage and a unipolar waveform, whose average is equal to this bias voltage and whose frequency is close to one half of the mechanical resonance frequency $f_R$, can be used to actuate the ribbon elements 31. Electrical isolation of the bottom conductive layer 22 of the GLV from the ground plane of the driver circuitry is then preferable.

The invention has been described in detail with particular reference to certain preferred embodiments thereof, but it will be understood that variations and modifications can be effected within the spirit and scope of the invention.

PARTS LIST

| | |
|---|---|
| 14 | incident light beam |
| 15 | reflected light beam |
| 16 | incident light beam |
| 17 | diffracted light beam $1^{st}$ order |
| 18 | diffracted light beam $-1^{st}$ order |
| 20 | substrate |
| 22 | bottom conductive layer |
| 23 | surface of the substrate |
| 24 | protective layer |
| 26 | spacer layer |
| 27 | upper surface level |
| 28 | channel |
| 30 | ribbon layer |
| 31 | ribbon elements |
| 32 | reflective layer |
| 34 | opening |
| 36 | conducting material |
| 42 | pull-down |
| 42a | pull-down |
| 42b | pull-down |
| 42c | pull-down |
| 42d | pull-down |
| 44 | release |
| 44a | release |
| 44b | release |
| 44c | release |
| 44d | release |
| 50 | rise time |
| 52 | decay time |
| 53 | actuation voltage generator |
| 54 | ribbon height |
| 55 | data generator |
| 56 | pulse-width-modulated data signal |
| 57 | modulator |
| 58 | ribbon voltage |
| 60 | unipolar triangular waveform |
| 61D | minimum of unipolar triangular waveform |
| 61U | maximum of unipolar triangular waveform |
| 62 | response 5 seconds after actuation |
| 63 | response 120 seconds after actuation |
| 65 | time period after onset of actuation |

-continued

PARTS LIST

| | |
|---|---|
| 67 | time period after onset of actuation |
| 70 | bipolar triangular waveform |
| 71 | stable ribbon response |
| 75 | resonant peak |
| 76 | width of resonant peak |
| $t_U$ | time interval |
| $t_D$ | time interval |
| $f_R$ | mechanical resonance frequency of the ribbon elements |

What is claimed is:

1. A method for actuating electro-mechanical ribbon elements suspended over a channel defining a bottom surface and having a bottom conductive layer formed below said bottom surface, the method comprising the steps of:

providing a data stream;

generating in accordance to said data stream a modulated high frequency voltage signal; and applying said modulated high frequency voltage signal to the ribbon elements.

2. The method as claimed in claim 1 wherein the step of generating the modulated high frequency voltage signal comprises the application of a unipolar high frequency voltage signal with respect to a bias voltage applied to the bottom conductive layer.

3. The method as claimed in claim 2 wherein the unipolar high frequency voltage signal has a frequency close to the mechanical resonance frequency of the ribbon elements.

4. The method as claimed in claim 1 wherein the step of generating the modulated high frequency voltage signal comprises the application of a bipolar high frequency voltage signal with respect to a bias voltage applied to the bottom conductive layer.

5. The method as claimed in claim 4 wherein the bipolar high frequency voltage signal has a frequency close to one half of the mechanical resonance frequency of the ribbon elements.

6. The method as claimed in claim 1 wherein the data stream is pulse width modulated.

7. A system for actuating electro-mechanical ribbon elements suspended over a channel defining a bottom surface and having a bottom conductive layer formed below said bottom surface the system comprising:

a data generator for providing a data stream; and a modulator for generating from said data stream a modulated high frequency voltage signal.

8. The system as claimed in claim 7 comprises an actuation voltage generator for providing to the modulator a unipolar high frequency voltage signal with respect to a bias voltage applied to the bottom conductive layer.

9. The system as claimed in claim 8 wherein the frequency of the unipolar high frequency voltage signal is close to the mechanical resonance frequency of the ribbon elements.

10. The system as claimed in claim 7 comprises an actuation voltage generator for providing to the modulator a bipolar high frequency voltage signal with respect to a bias voltage applied to the bottom conductive layer.

11. The system as claimed in claim 10 wherein the frequency of the bipolar high frequency voltage signal is close to one half of the mechanical resonance frequency of the ribbon elements.

* * * * *